(12) United States Patent
Zou et al.

(10) Patent No.: US 8,717,191 B2
(45) Date of Patent: May 6, 2014

(54) ERROR INDICATION CIRCUIT

(75) Inventors: Hua Zou, Wuhan (CN); Chun-Sheng Chen, New Taipei (TW)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 60 days.

(21) Appl. No.: 13/589,247

(22) Filed: Aug. 20, 2012

(65) Prior Publication Data

US 2013/0300567 A1 Nov. 14, 2013

(30) Foreign Application Priority Data

May 10, 2012 (CN) .......................... 2012 1 0143451

(51) Int. Cl.
*G08B 5/22* (2006.01)
(52) U.S. Cl.
USPC ...... 340/815.45; 340/649; 340/650; 340/638; 340/659; 340/686.6; 315/83; 315/193; 315/362
(58) Field of Classification Search
CPC .............................. B60Q 11/00; B60Q 11/005
USPC ......... 340/815.45, 638, 649, 650, 659, 686.6; 315/83, 193, 362
See application file for complete search history.

(56) References Cited

U.S. PATENT DOCUMENTS 4,222,047 A * 9/1980 Finnegan ....................... 340/641
6,507,154 B1 * 1/2003 Menke ............................ 315/83

* cited by examiner

*Primary Examiner* — Tai T Nguyen
(74) *Attorney, Agent, or Firm* — Novak Druce Connolly Bove + Quigg LLP

(57) ABSTRACT

An indication circuit is used on a motherboard. First and second pins on the motherboard output different signals corresponding to different power-on self-test errors. The indication circuit includes first to third electronic switches, first and second light-emitting diodes, and first to fifth resistors. When different errors occurred during power-on self-test, different signals are output from the first and second pins on the motherboard, such that to make the first and second light-emitting diodes activated or deactivated. As a result, the indication circuit can indicate different errors when the motherboard is performing power-on self-test.

6 Claims, 1 Drawing Sheet

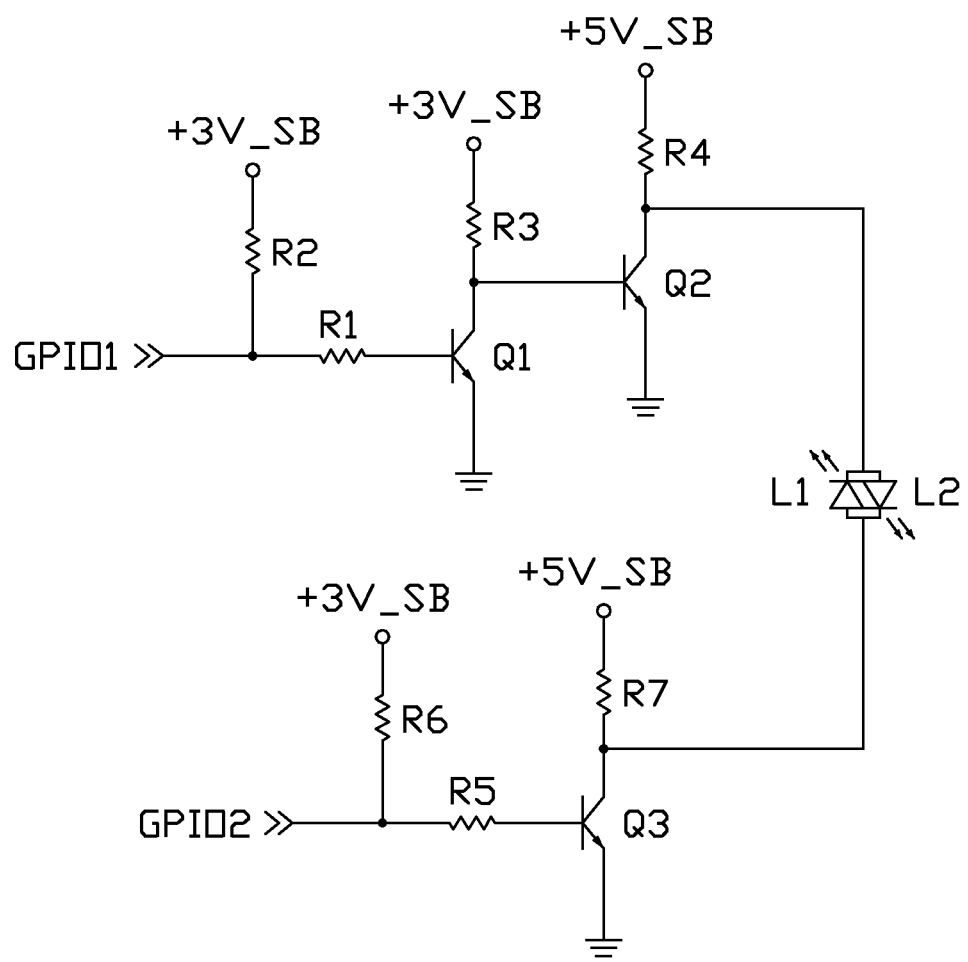

ERROR INDICATION CIRCUIT

BACKGROUND

1. Technical Field

The present disclosure relates to a circuit for indicating errors when a computer system performs power-on self-test (POST).

2. Description of Related Art

Some motherboards have an onboard buzzer for indicating errors occurred when a computer system during POST when the computer system is booting up. When there are errors occurred during POST, the buzzer is activated. For example, when there is a keyboard controller error, the buzzer is activated with three long beeps. However, for the hearing impaired, the buzzer may not be of any help. Therefore there is room for improvement in the art.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

The FIGURE is a circuit diagram of an exemplary embodiment of an indication circuit.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean at least one.

Referring to the FIGURE, an exemplary embodiment of an indication circuit is used for a computer system. The indication circuit includes three bipolar junction transistors (BJTs) Q1-Q3, seven resistors R1-R7, and two light-emitting diodes (LEDs) L1 and L2. In the embodiment, the LED L1 is a yellow LED, and the LED L2 is a green LED. The transistors Q1-Q3 are npn type BJTs.

A base of the BJT Q1 is connected to a general purpose input output (GPIO) pin GPIO1 on a motherboard through the resistor R1. A node between the resistor R1 and the GPIO pin GPIO1 is further connected to a power supply +3V_SB through the resistor R2. An emitter of the BJT Q1 is grounded. A collector of the BJT Q1 is connected to the power supply +3V_SB through the resistor R3. The collector of the BJT Q1 is further connected to a base of the BJT Q2. An emitter of the BJT Q2 is grounded. A collector of the BJT Q2 is connected to a power supply +5V_SB through the resistor R4. The collector of the BJT Q2 is connected to a cathode of the LED L1 and an anode of the LED L2.

A base of the BJT Q3 is connected to a GPIO pin GPIO2 on the motherboard through the resistor R5. Anode between the resistor R5 and the GPIO pin GPIO2 is further connected to the power supply +3V_SB through the resistor R6. An emitter of the BJT Q3 is grounded. A collector of the BJT Q3 is connected to the power supply +5V_SB through the resistor R7. The collector of the BJT Q3 is further connected to an anode of the LED L1 and a cathode of the LED L2.

Signals output from the GPIO pins GPIO1 and GPIO2, which can be set by the basic input output system (BIOS) are shown in Table 1 below:

TABLE 1

| Errors | Signal from the GPIO pin GPIO1 | Signal from the GPIO pin GPIO2 |
| --- | --- | --- |
| Normal POST | 1 | 1 |
| RAM problem | Blinking/1 Hz | 1 |
| Display or VGA card problem | 0 | Blinking/1 Hz |
| Keyboard controller problem | Blinking/0.5 Hz | 1 |
| Memory problem | 0 | Blinking/0.5 Hz |

In the table 1 above, "0" stands for Low Level, "1" stands for High Level, "Blinking/1 Hz" stands for a frequency of the signal output from the GPIO pin is 1 Hz, and "Blinking/0.5 Hz" stands for a frequency of the signal output from the GPIO pin is 0.5 Hz.

When the computer system is working normally, the GPIO pins GPIO1 and GPIO2 output high level signals. In the condition, the BJTs Q1 and Q3 are turned on, and the BJT Q2 is turned off. As a result, the LED L1 is deactivated, and the LED L2 is activated. In other words, the indication circuit emits green lights.

When there are random-access memory (RAM) errors, the GPIO pin GPIO1 outputs a high level signal with a frequency of 1 Hz, and the GPIO pin GPIO2 outputs a high level signal. In this condition, the transistor Q3 is turned on. When the GPIO pin GPIO1 outputs a high level signal, the BJT Q1 is turned on, and the BJT Q2 is turned off. As a result, the LED L1 is deactivated, and the LED L2 is activated. In other words, the indication circuit emits green lights. When the GPIO pin GPIO1 does not output the high level signal, the BJT Q1 is turned off, and the BJT Q2 is turned on. As a result, the LEDs L1 and L2 are deactivated. In other words, the indication circuit emits no light. As a result, when there are RAM errors, the indication circuit blinks with green lights at a frequency of 1 Hz.

When there are display or video graphics array (VGA) card errors, the GPIO pin GPIO1 outputs a low level signal, and the GPIO pin GPIO2 outputs a high level signal with a frequency of 1 Hz. In this condition, the BJT Q1 is turned off, and the BJT Q2 is turned on. When the GPIO pin GPIO2 outputs a high level signal, the BJT Q3 is turned on. As a result, the LEDs L1 and L2 are deactivated. In other words, the indication circuit emits no light. When the GPIO pin GPIO2 does not output the high level signal, the BJT Q3 is turned off. As a result, the LED L1 is activated, and the LED L2 is deactivated. The indication circuit emits yellow lights. As a result, when there are display or VGA card errors of the computer system, the indication circuit blinks with yellow lights at a frequency of 1 Hz.

When there are keyboard controller errors, the GPIO pin GPIO1 outputs a high level signal with a frequency of 0.5 Hz, and the GPIO pin GPIO2 outputs a high level signal. In this condition, the BJT Q3 is turned on. When the GPIO pin GPIO1 outputs a high level signal, the BJT Q1 is turned on, and the BJT Q2 is turned off. As a result, the LED L1 is deactivated, and the LED L2 is activated. The indication circuit emits green lights. When the GPIO pin GPIO1 does not output the high level signal, the BJT Q1 is turned off, and the BJT Q2 is turned on. As a result, the LEDs L1 and L2 are deactivated. The indication circuit emits no light. As a result, when there are keyboard controller errors, the indication circuit blinks with green lights at a frequency of 0.5 Hz.

When there are memory errors, the GPIO pin GPIO1 outputs a low level signal, and the GPIO pin GPIO2 outputs a high level signal with a frequency of 0.5 Hz. In this condition, the BJT Q1 is turned off, and the BJT Q2 is turned on. When the GPIO pin GPIO2 outputs a high level signal, the BJT Q3 is turned on. As a result, the LEDs L1 and L2 are deactivated. The indication circuit emits no light. When the GPIO pin GPIO2 does not output the high level signal, the BJT Q3 is turned off. As a result, the LED L1 is activated, and the LED L2 is deactivated. The indication circuit emits yellow lights. As a result, when there are memory errors, the indication circuit blinks with yellow lights at a frequency of 0.5 Hz.

In the embodiment, the BJTs Q1-Q3 function as electronic switches. Moreover, the signals output from the GPIO pins GPIO1 and GPIO2 as shown in the table 1 are defined by users. In other embodiments, the signals output from the GPIO pins GPIO1 and GPIO2 can be different from the signals shown in table 1.

The LEDs L1 and L2 flash in different colors or at different frequencies to indicate specific error conditions during POST.

The foregoing description of the exemplary embodiments of the disclosure has been presented only for the purposes of illustration and description and is not intended to be exhaustive or to limit the disclosure to the precise forms disclosed. Many modifications and variations are possible in the light of everything above. The embodiments were chosen and described in order to explain the principles of the disclosure and their practical application so as to enable others of ordinary skill in the art to utilize the disclosure and various embodiments with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An indication circuit used on a motherboard, first and second pins on the motherboard output different signals corresponding to different errors when the motherboard is performing power-on self-test, the indication circuit comprising:
    first to third electronic switches, wherein a control terminal of the first electronic switch is connected to the first pin on the motherboard, the control terminal of the first electronic switch is further connected to a first power supply through a first resistor, a first terminal of the first electronic switch is grounded, a second terminal of the first electronic switch is connected to the first power supply through a second resistor, a control terminal of the second electronic switch is connected to the second terminal of the first electronic switch, a first terminal of the second electronic switch is grounded, a second terminal of the second electronic switch is connected to a second power supply through a third resistor, a control terminal of the third electronic switch is connected to the second pin on the motherboard, the control terminal of the third electronic switch is further connected to the first power supply through a fourth resistor, a first terminal of the third electronic switch is grounded, a second terminal of the third electronic switch is connected to the second power supply through a fifth resistor; and
    first and second light-emitting diodes (LEDs), wherein a cathode of the first LED and an anode of the second LED are connected to the second terminal of the second electronic switch, an anode of the first LED and a cathode of the second LED are connected to the second terminal of the third electronic switch;
    wherein when the control terminal of the first electronic switch receives a high level signal from the first pin on the motherboard, the first electronic switch is turned on, and the second electronic switch is turned off; when the control terminal of the first electronic switch receives a low level from the first pin on the motherboard, the first electronic switch is turned off, and the second electronic switch is turned on; when the control terminal of the third electronic switch receives a high level signal from the second pin on the motherboard, the third electronic switch is turned on; when the control terminal of the third electronic switch receives a low level signal from the second pin on the motherboard, the third electronic switch is turned off.

2. The indication circuit of claim 1, further comprising a sixth resistor, wherein the control terminal of the first electronic switch is connected to the first pin on the motherboard through the sixth resistor.

3. The indication circuit of claim 1, further comprising a seventh resistor, wherein the control terminal of the third electronic switch is connected to the second pin on the motherboard through the seventh resistor.

4. The indication circuit of claim 1, wherein the first electronic switch is an npn type bipolar junction transistor (BJT), the control terminal of the first electronic switch is a base of the BJT, the first terminal of the first electronic switch is an emitter of the BJT, the second terminal of the first electronic switch is a collector of the BJT.

5. The indication circuit of claim 1, wherein the second electronic switch is an npn type BJT, the control terminal of the second electronic switch is a base of the BJT, the first terminal of the second electronic switch is an emitter of the BJT, the second terminal of the second electronic switch is a collector of the BJT.

6. The indication circuit of claim 1, wherein the third electronic switch is an npn type BJT, the control terminal of the third electronic switch is a base of the BJT, the first terminal of the third electronic switch is an emitter of the BJT, the second terminal of the third electronic switch is a collector of the BJT.

* * * * *